(12) United States Patent
Petrovski et al.

(10) Patent No.: US 10,099,385 B2
(45) Date of Patent: Oct. 16, 2018

(54) END EFFECTORS CARRYING PLIES OF MATERIAL FOR SHAPING BY A MANDREL

(71) Applicant: The Boeing Company, Chicago, IL (US)

(72) Inventors: Goce Petrovski, Epping (AU); Andrew Klimovski, Doncaster East (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/425,879

(22) Filed: Feb. 6, 2017

(65) Prior Publication Data

US 2018/0222060 A1    Aug. 9, 2018

(51) Int. Cl.
    *B25J 15/06*    (2006.01)
(52) U.S. Cl.
    CPC ................ *B25J 15/0616* (2013.01)
(58) Field of Classification Search
    CPC .... B65G 47/91; B65G 47/911; B25J 15/0616;
        B65H 3/0816; B65H 3/0883; C03B
        23/0302; C03B 23/305; C03B 23/031;
        C03B 23/0357; C03B 40/005
    See application file for complete search history.

(56) References Cited

U.S. PATENT DOCUMENTS

| | | | | |
|---|---|---|---|---|
| 4,129,328 A * | 12/1978 | Littell | ................ | B65G 47/918 294/65 |
| 6,431,623 B1 * | 8/2002 | Roeters | ................ | B65G 47/91 271/90 |
| 6,641,131 B2 * | 11/2003 | Stohr | ................ | B65H 3/0883 271/107 |
| 9,821,474 B2 * | 11/2017 | Reinhold | ............ | B65H 3/0816 |
| 2005/0263949 A1 * | 12/2005 | Boyl-Davis | ........... | B25B 11/007 269/266 |
| 2014/0199153 A1 | 7/2014 | Reinhold et al. | | |
| 2014/0367037 A1 * | 12/2014 | Metschan | ........... | B32B 38/1858 156/285 |

OTHER PUBLICATIONS

Festo Bernoulli Gripper OGGB; Ralph W Earl Company Inc; Published on May 29, 2014https://www.youtube.com/watch?v=phSlc8B4kFo.
VMECA Catalog; Smart Plungers.
VMECA; Smart Suction Cups; www.vmeca.com.

* cited by examiner

*Primary Examiner* — Stephen A Vu
(74) *Attorney, Agent, or Firm* — Duft Bornsen & Fettig LLP

(57) ABSTRACT

Systems and methods are provided for carrying plies of material. One embodiment is an apparatus that includes an end effector of a robot. The apparatus includes a frame, and a fixed cup assembly that is attached to the frame. The fixed cup assembly includes a suction cup for holding a ply, a pneumatic line, and a shaft that is coupled with the suction cup and that houses the pneumatic line, the shaft enabling the suction cup to translate vertically. The apparatus also includes floating cup assemblies. Each floating cup assembly includes a Bernoulli cup, a pneumatic line applying positively pressurized gas to the Bernoulli cup, a shaft that is coupled with the Bernoulli cup and that houses the pneumatic line, the shaft enabling the Bernoulli cup to translate vertically, and a bearing that enables the Bernoulli cup to pivot about an end of the shaft to conform with a surface.

24 Claims, 10 Drawing Sheets

END EFFECTORS CARRYING PLIES OF MATERIAL FOR SHAPING BY A MANDREL

FIELD

The disclosure relates to the field of robotics, and in particular, to end effectors for robots.

BACKGROUND

Robots may be utilized for a variety of purposes and activities. In a manufacturing and fabrication environment, some robots are utilized to pick up and carry plies of material to a mandrel for shaping. These robots may include an end effector that picks up a ply and applies force to the ply in order to conform the ply with the mandrel.

For example, in an environment where Carbon Fiber Reinforced Polymer (CFRP) is being fabricated, a robot may use an end effector to pick up the ply and form the ply onto a mandrel defining a complex surface for the ply. This operation may be performed multiple times for multiple plies in order to build up a composite pre-form of dry carbon fiber. The composite pre-form may then be impregnated with curable resin, and cured in order to form CFRP. During the layup process in which plies are placed onto the mandrel, it remains desirable to prevent the formation of wrinkles within any ply, as wrinkles are not desirable in any fabricated CFRP. Furthermore, as plies of dry carbon fiber are delicate, it also remains important to ensure that the end effector does not apply forces that would warp or damage the ply during transport and shaping. Hence, fabricators of CFRP continue to seek out end effector technologies that are both capable and cost-effective.

SUMMARY

Embodiments described herein provide for enhanced robot end effectors that include multiple Bernoulli cups and a suction cup to transport a ply of material. The Bernoulli cups enable portions of the ply to float horizontally while held to the end effector, and also are capable of pivoting and deflecting in order to conform the face of the ply to a surface of a mandrel upon which the ply is laid. The floating of the Bernoulli cups with respect to the ply ensures that the end effector holds the ply in position without damaging the ply or generating wrinkles, even as the ply is conformed to the surface of the mandrel.

One embodiment is an apparatus that includes an end effector of a robot. The apparatus includes a frame, and a fixed cup assembly that is attached to the frame. The fixed cup assembly includes a suction cup for holding a ply, a pneumatic line applying negatively pressurized gas to an interior of the suction cup, and a shaft that is coupled with the suction cup and that houses the pneumatic line, the shaft enabling the suction cup to translate vertically. The apparatus also includes floating cup assemblies that are attached to the frame. Each floating cup assembly includes a Bernoulli cup, a pneumatic line applying positively pressurized gas to the Bernoulli cup, a shaft that is coupled with the Bernoulli cup and that houses the pneumatic line, the shaft enabling the Bernoulli cup to translate vertically, and a bearing that enables the Bernoulli cup to pivot about an end of the shaft to conform with a surface.

Another embodiment is a method. The method includes holding a ply of dry carbon fiber in contact with an end effector of a robot via a suction cup and multiple Bernoulli cups without shaping the ply, positioning the ply over a mandrel having a curved surface, without shaping the ply, and conforming the ply to the curved surface of the mandrel. This causes the Bernoulli cups to float along the ply, pivot, and deflect vertically as the ply changes shape.

Another embodiment is a non-transitory computer readable medium embodying programmed instructions which, when executed by a processor, are operable for performing a method. The method includes holding a ply of dry carbon fiber in contact with an end effector of a robot via a suction cup and multiple Bernoulli cups without shaping the ply, positioning the ply over a mandrel having a curved surface, without shaping the ply, and conforming the ply to the curved surface of the mandrel. This causes the Bernoulli cups to float along the ply, pivot, and deflect vertically as the ply changes shape.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
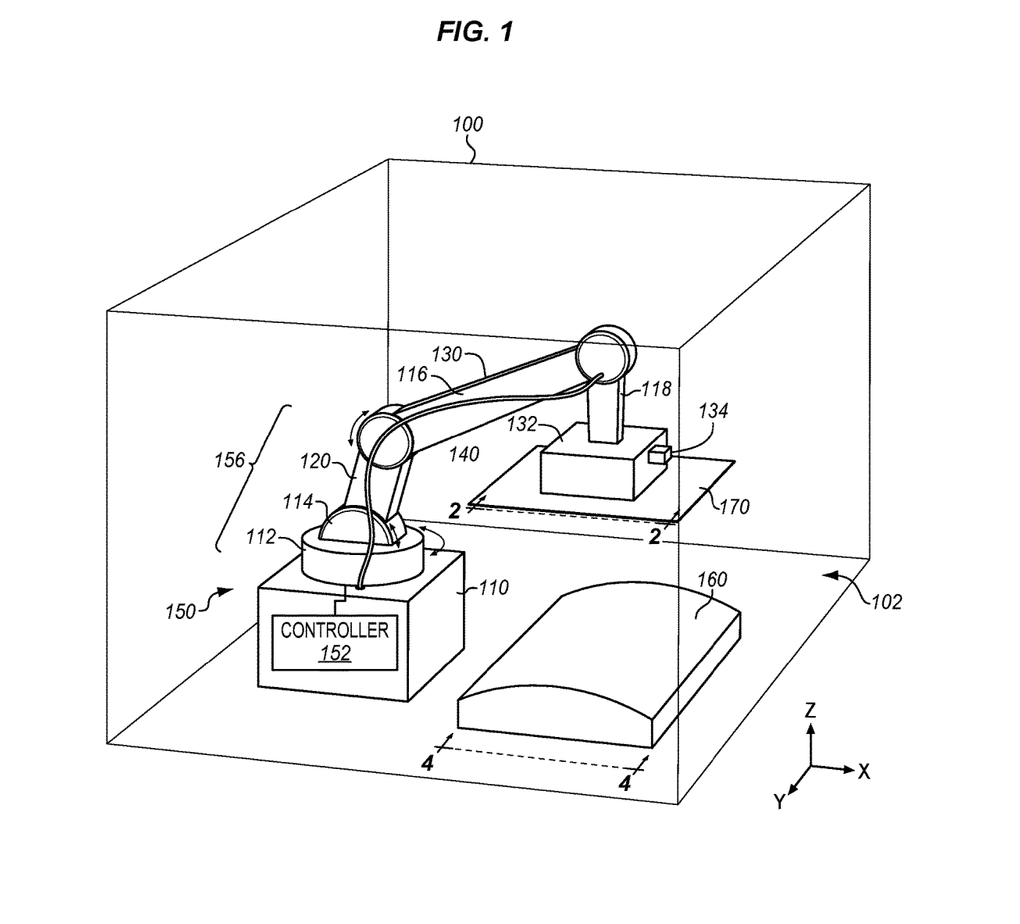
FIG. 1 is a block diagram of a robot operating within a manufacturing cell in an exemplary embodiment.

FIG. 1 depicts a robot 150 operating within a manufacturing cell 100 to place a ply 170 of dry carbon fiber onto a mandrel 160 in an exemplary embodiment. Manufacturing cell 100 comprises any volume of space in which robot 150 is expected to operate to facilitate manufacturing, fabrication, and/or assembly of CFRP parts. For example, manufacturing cell 100 may comprise an enclosed space, or an open volume of space on a factory floor. According to FIG. 1, manufacturing cell 100 includes volume 102, base 110, robot 150 mounted to base 110, ply 170, and mandrel 160. Base 110 may comprise a structural component occupying a fixed location within manufacturing cell 100, or may comprise a mobile feature (e.g., a cart) capable of being driven across the factory floor in order to arrange robots and/or tooling into various configurations as desired. Thus, in some embodiments base 110, ply 170, and mandrel 160 are mobile and/or drivable across the factory floor. Robot 150 is mounted to base 110, and includes multiple actuators (112, 114, 116, 118) and rigid bodies (120, 130) which together define a kinematic chain 156. Robot 150 also includes dressing 140 (e.g., cabling), and end effector 132, which holds ply 170 in place during transport and shapes ply 170 onto mandrel 160. During transport, ply 170 is held flat to ensure that no wrinkling or warping occurs in ply 170.

Controller 152 directs the operations of robot 150, including end effector 132 and imaging system 134. Controller 152 may be implemented, for example, as custom circuitry, as a processor executing programmed instructions, or some combination thereof.

Ply 170 is described as a ply of dry carbon fiber, but may comprise any suitable dry fiber pre-form for impregnation with curable resin in order to form a composite part. For example, ply 170 may comprise fiberglass, wood fibers, etc., and may even comprise a tackifier (e.g., a thermoset or thermoplastic tackifier) having less than "pre-preg" amounts of quantity.

Figure 2:
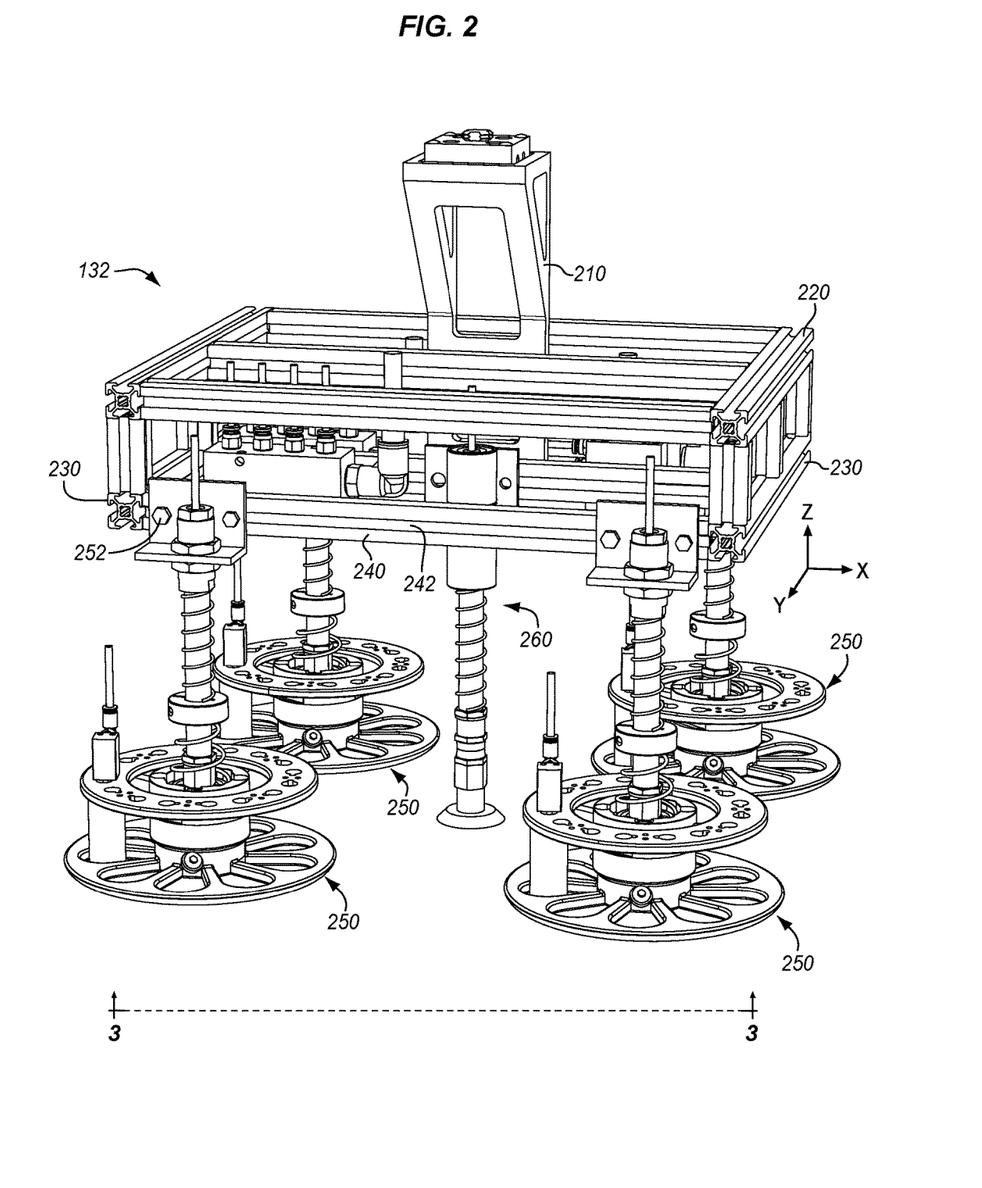
FIGS. 2-3 are diagrams illustrating an end effector of a robot used for transporting and shaping plies of dry carbon fiber in an exemplary embodiment.
Figure 3:
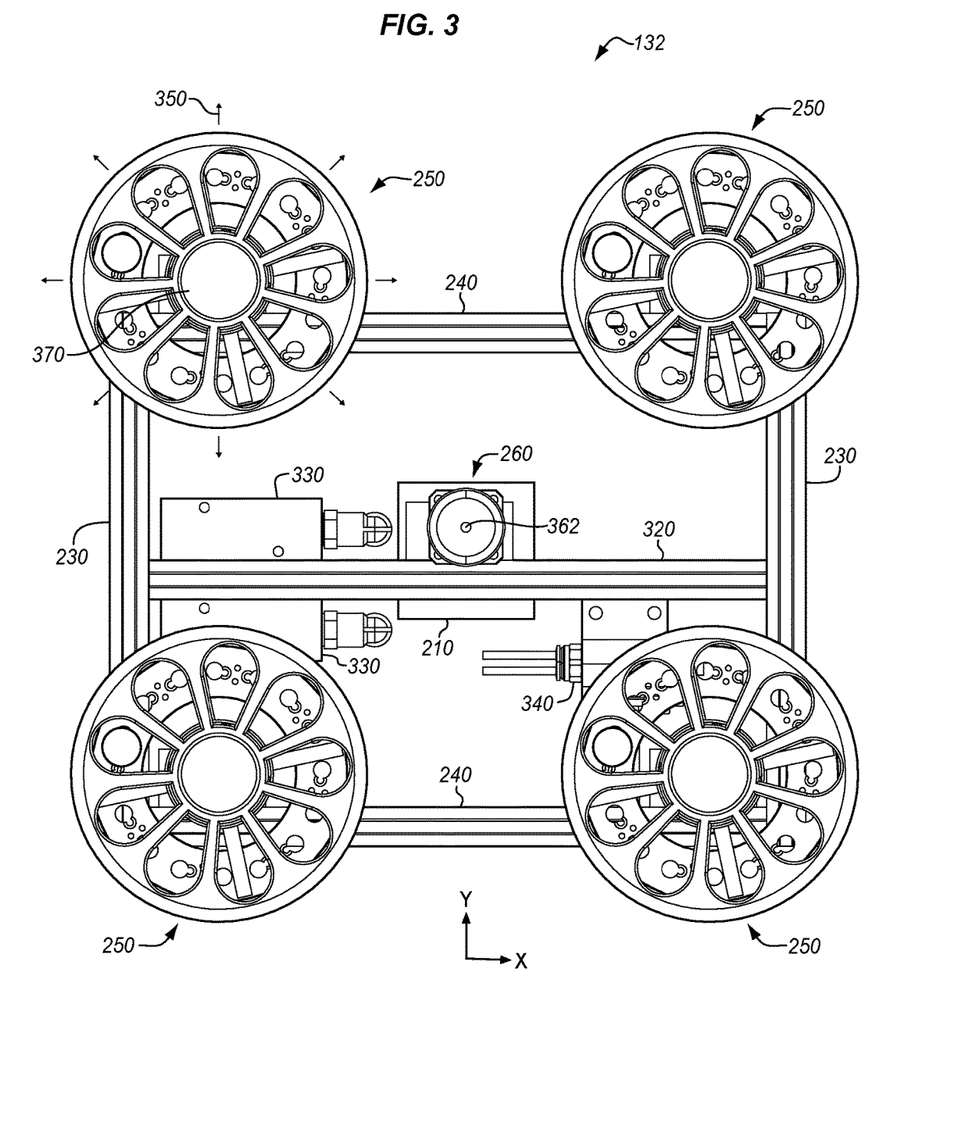

FIGS. 2-3 illustrate views of end effector 132, which utilizes differences in pressure to secure ply 170 to end effector 132. Specifically, FIG. 2 is a perspective view of end effector 132 indicated by view arrows 2 of FIG. 1, while FIG. 3 is a bottom view of end effector 132 indicated by view arrows 3 of FIG. 2. In this embodiment, end effector 132 includes support 210, which is attached to a rigid body of robot 150. Frame 220 is attached to support 210, and includes members 230 and 240. Floating cup assemblies 250 are mounted to members 240 via couplings 252 at tracks 242. End effector 132 further comprises a fixed cup assembly 260, which is fixedly attached to frame 220 in a similar manner to floating cup assemblies 250.

FIG. 3 illustrates members 240 which are fixed to members 230. FIG. 3 further illustrates member 320, to which support 210 and members 230 are attached. Pneumatic manifolds 330 are attached to member 320, as is ejector 340. One pneumatic manifold 330 may supply pressurized air to Bernoulli cups 370 at floating cup assemblies 250, while another pneumatic manifold 330 may supply pressurized air to pneumatic actuators (described below) at floating cup assemblies 250. Ejector 340 is in this embodiment comprises a Venturi vacuum generator which generates negative pressure for use by fixed cup assembly 260. When airflow is applied via a pneumatic manifold 330 to a floating cup assembly 250, airflow 350 exits Bernoulli cup 370 of floating cup assembly 250, causing negative pressure which draws ply 170 into contact with floating cup assembly 250 while still allowing ply 170 to float horizontally. Inlet 362 of fixed cup assembly 260 is also illustrated, and may be utilized in one embodiment to draw air from fixed cup assembly 260 in order to create a negative pressure (i.e., suction) that holds ply 170 fixed in place at end effector 132.

Figure 4:
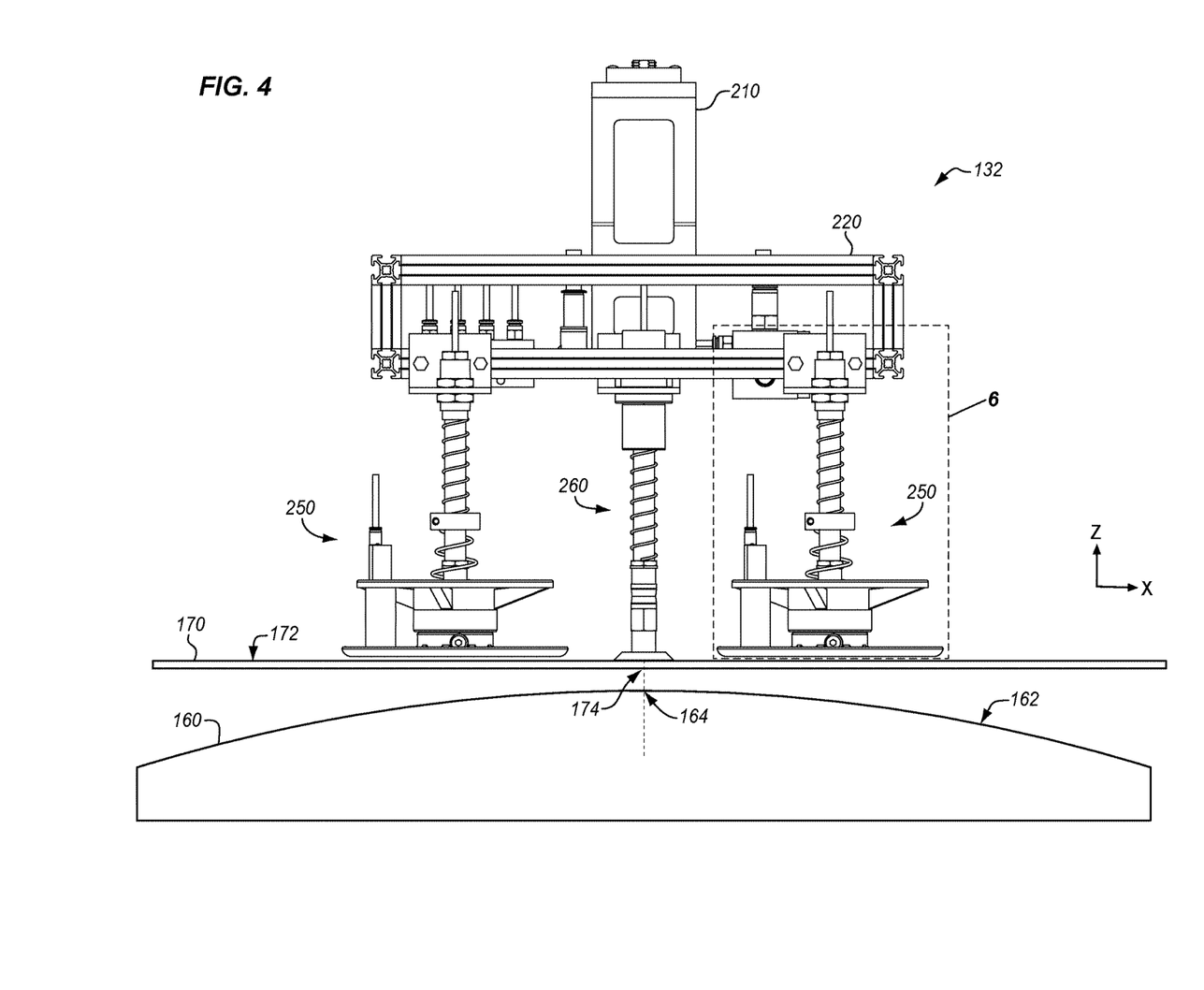
FIGS. 4-5 are diagrams illustrating placement of a ply of carbon fiber onto a mandrel in an exemplary embodiment.
Figure 5:
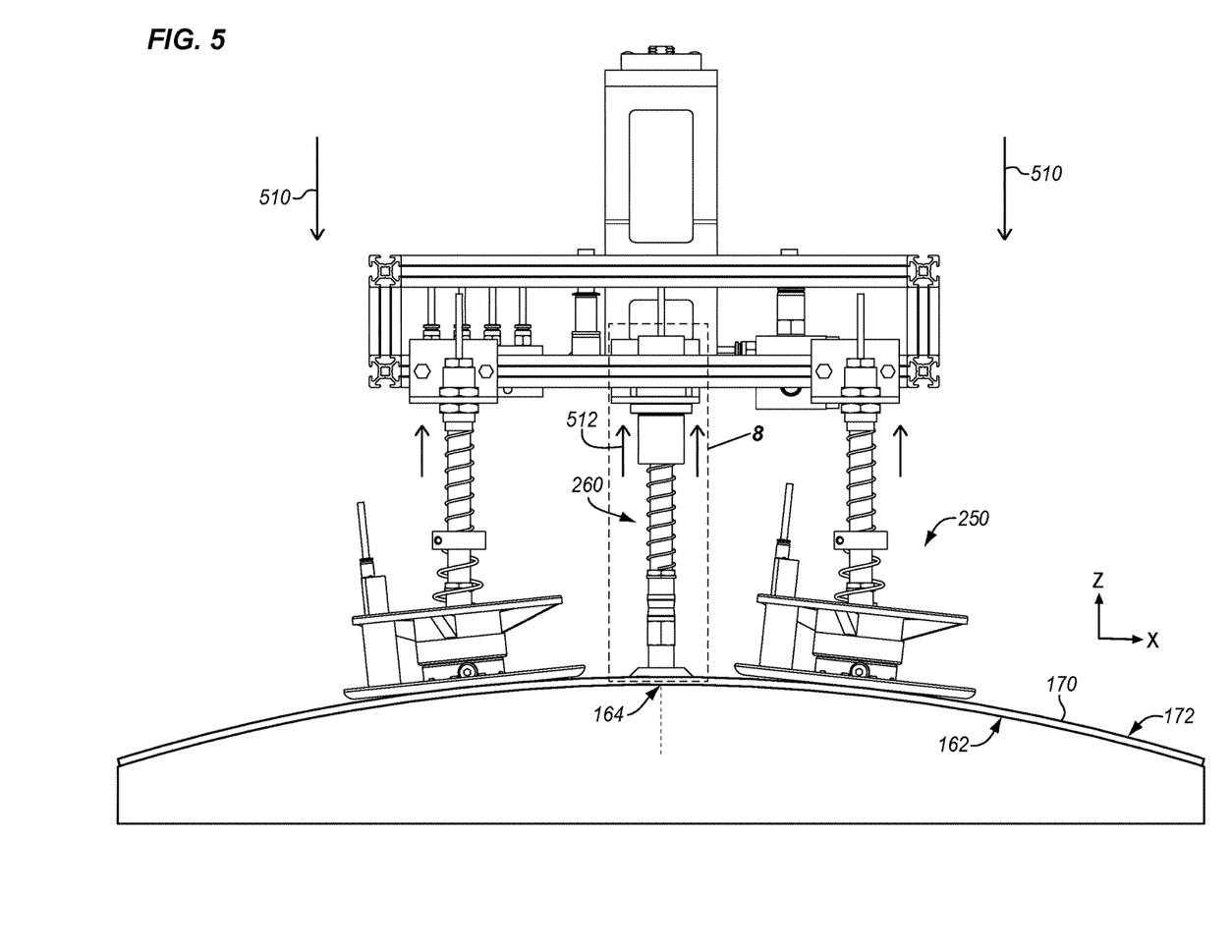

With the architecture of end effector 132 described, the operations of end effector 132 during transport and shaping of ply 170 will be illustrated in FIGS. 4-5 and discussed.

FIG. 4 is a side view of mandrel 160 illustrated by view arrows 4 of FIG. 1. Specifically, FIG. 4 illustrates end effector 132 holding ply 170 flat over mandrel 160. Surface 172 of ply 170 contacts floating cup assemblies 250 and fixed cup assembly 260 due to a pressure differential created at floating cup assemblies 250 taking advantage of the Bernoulli principle and also due to suction generated at fixed cup assembly 260. Ply 170 will be placed onto mandrel 160 and shaped into compliance with surface 162, which is curved. Midpoint 174 of ply 170 is aligned with fixed cup assembly 260, and with midpoint 164 of surface 162 of mandrel 160. As end effector 132 is moved towards mandrel 160, fixed cup assembly 260 will be the first component to place ply 170 in contact with mandrel 160.

As shown in FIG. 5 which corresponds with the view shown in FIG. 4, as end effector 132 is moved in direction 510 downward towards mandrel 160, ply 170 is shaped into compliance with surface 162, resulting in a curved shape. During shaping, floating cup assemblies 250 slide (i.e., float) horizontally along X and Y with respect to surface 172 of ply 170. Furthermore, floating cup assemblies 250 may further deflect in position along the Z direction, and pivot in order to conform with surface 162. This ensures that ply 170 remains in contact with floating cup assemblies 250 throughout the shaping process, as surface 162 of mandrel 160 enforces a contour upon ply 170. Furthermore, it enables curves imposed upon ply 170 by mandrel 160 to be formed without wrinkling. If ply 170 was secured to floating cup assemblies 250 without being able to float freely horizontally, then enforcement of a curvature onto ply 170 would cause wrinkling along ply 170. The distance between fixed cup assembly 260 and floating cup assemblies 250 increases as ply 170 is placed onto mandrel 160 as the floating cup assemblies 250 conform to surface 162. This results in ply 170 being pulled while still being allowed to float with respect to floating cup assemblies 250. The increased distance therefore is dealt with by enabling material within ply 170 to slip with respect to end effector 132. Hence, floating cup assemblies 250 ensure that ply 170 may be conformed to surface 162 without wrinkle formation. At the same time, if only floating cup assemblies 250 were utilized by end effector 132, then the entirety of ply 170 could float horizontally with respect to end effector 132, resulting in positional and angular deviations in ply 170 during shaping. By combining one fixed cup assembly 260 with multiple floating cup assemblies 250, end effector 132 beneficially ensures that ply 170 is properly positioned and oriented during shaping, while also enabling ply to conform with mandrel 160 during application to mandrel 160, and without forming wrinkles.

Figure 6:
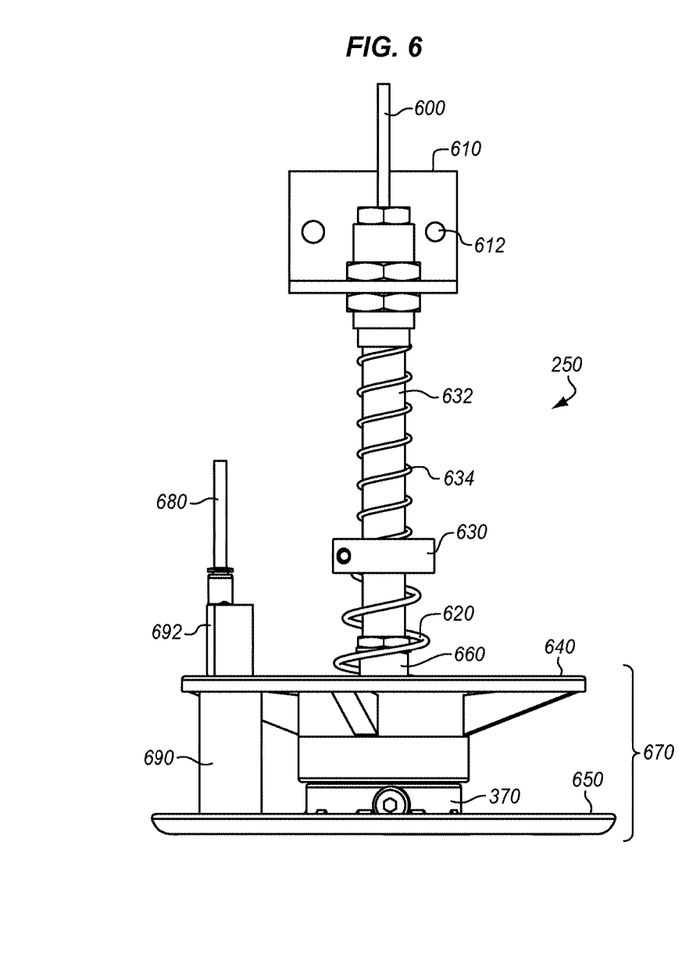
FIGS. 6-7 are diagrams illustrating a floating cup assembly of an end effector in an exemplary embodiment.
Figure 7:
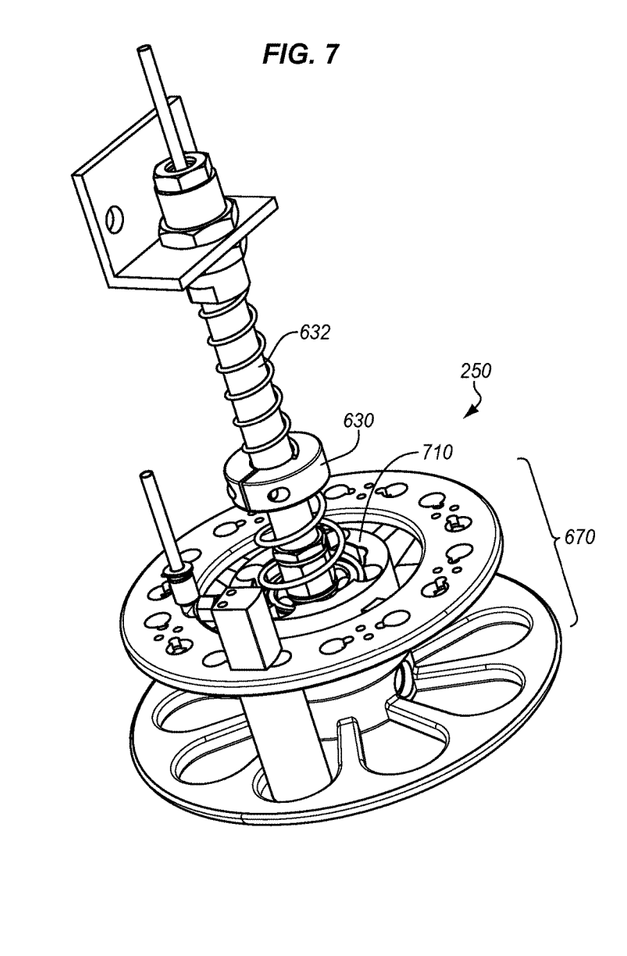

FIGS. 6-7 further illustrate components of floating cup assembly 250. Specifically, FIG. 6 corresponds with region 6 of FIG. 4, and FIG. 7 is a perspective view of region 6. As shown in FIG. 6, floating cup assembly 250 includes pneumatic line 600, which receives pressurized gas (e.g., air) via a pneumatic manifold 330. The pressurized gas is blown out of Bernoulli cup 370 of floating cup assembly 250. Floating cup assembly 250 further includes bracket 610, having cutouts 612 into which a coupling may be inserted in order to secure floating cup assembly 250 to track 242 of FIG. 2.

Shaft 632 is compressible, supports head 670, and provides a pathway for pneumatic line 600 through floating cup assembly 250. Spring 634 allows for shaft 632 to compress along Z as ply 170 is forced into compliance with surface 162, and returns shaft 632 to a default position and/or length at rest. A biasing device, in this embodiment compression spring 620, returns head 670 via pivoting to a default (e.g., flat) orientation at rest, ensuring that head 670 remains level. Collar 630 holds compression spring 620 in place. Fitting 660 may be utilized to mount and dismount head 670 from shaft 632. Head 670 includes Bernoulli adapter 640 and Bernoulli extender 650. Bernoulli extender 650 acts as a lever arm that, in response to contact with a surface, reduces the amount of force needed to pivot head 670 (and hence Bernoulli cup 370) to a new orientation normal to that surface.

In this embodiment, head 670 further includes a heating element 690 (e.g., a thermally shielded heating element) secured to Bernoulli adapter 640. A pneumatic actuator 692 actuates heating element 690 in order to place heating element 690 into and out of contact with ply 170, and a pneumatic line 680 supplies air to pneumatic actuator 692 from a pneumatic manifold 330. During shaping of ply 170, end effector 132 may actuate heating element 690 in order to make contact with surface 172. This heats ply 170 to a tacking temperature of at least one hundred and eighty degrees Fahrenheit (e.g., 190° F.) at which ply 170 tacks to a ply 170 that has been previously placed onto mandrel 160 (or at which ply 170 tacks to mandrel 160 itself). This ensures that, even if ply 170 is laid-up in a substantially vertical orientation onto mandrel 160 during layup, ply 170 will not slip or fall away from mandrel 160 after end effector 132 is removed (e.g., in order to acquire and shape another ply to form a pre-form for a multi-layer composite part). Heating element 690, because it is integrated with head 670, is capable of deflecting to orient normal to the surface of ply 170 when ply 170 is being shaped, and is capable of doing so without needing an independent bearing and support structure. FIG. 7 illustrates similar features to those shown in FIG. 6, but further illustrates bearing 710, which enables head 670 to pivot in order to conform with surface 162 of mandrel 160.

Figure 8:
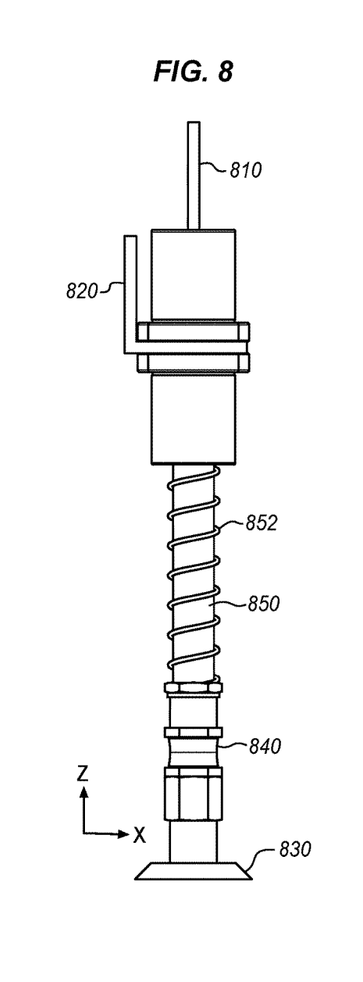
FIGS. 8-9 are diagrams illustrating a fixed cup assembly of an end effector in an exemplary embodiment.
Figure 9:
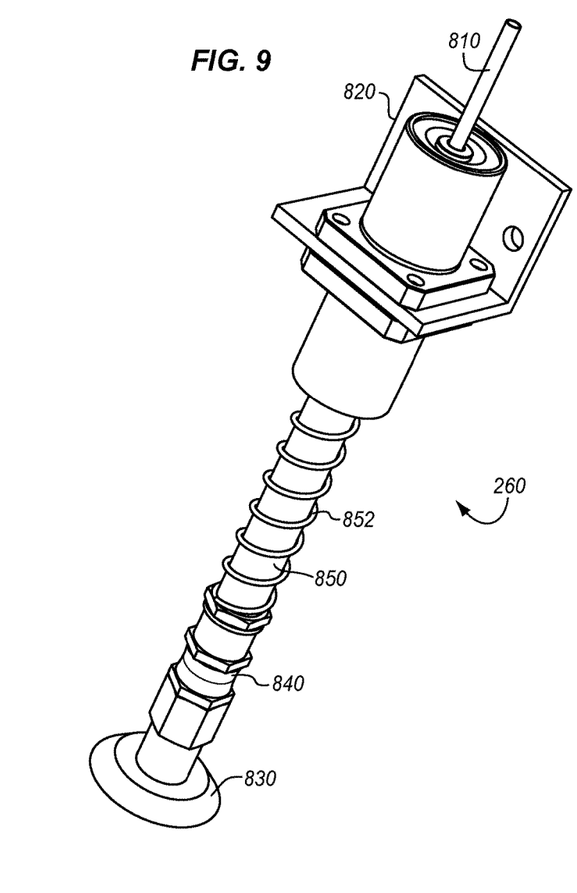

FIGS. 8-9 further illustrate components of fixed cup assembly 260. Specifically, FIG. 8 corresponds with region 8 of FIG. 5, and FIG. 9 is a perspective view of region 8. Fixed cup assembly 260 includes bracket 820, which is fixedly attached to member 320 of FIG. 3. Pneumatic line 810 controls pressure at fixed cup assembly 260, and hence may be utilized to apply negatively pressurized gas (e.g., air) that results in suction at suction cup 830 in order to ensure that ply 170 is held securely in contact with end effector 132. In this embodiment, fixed cup assembly 260 further includes fitting 840, which enables suction cup 830 to be threaded in place. Shaft 850, in combination with spring 852, enables suction cup 830 to translate vertically (i.e., in the Z direction) while shaping ply 170 at mandrel 160.

With the details of the technical components of end effector 132 fully described, illustrative details of the operation of end effector 132 will be discussed with regard to FIG. 10. Assume, for this embodiment, that end effector 132 is laying up plies of dry carbon fiber onto mandrel 160 in order to form a multi-layer charge which will be impregnated with curable resin and cured in order to form a CFRP part.

Figure 10:
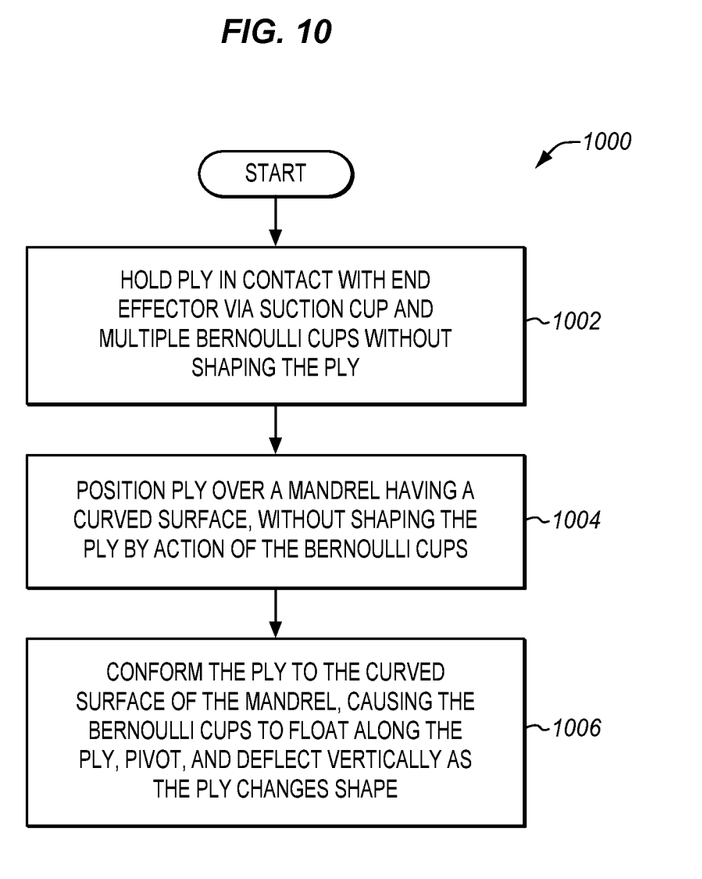
FIG. 10 is a flowchart illustrating a method for operating an end effector of a robot in an exemplary embodiment.

FIG. 10 is a flowchart illustrating a method 1000 for operating an end effector 132 in order to lay up plies of dry carbon fiber in an exemplary embodiment. The steps of method 1000 are described with reference to end effector 132 and robot 150 of FIG. 1, but those skilled in the art will appreciate that method 1000 may be performed in other systems. The steps of the flowcharts described herein are not all inclusive and may include other steps not shown. The steps described herein may also be performed in an alternative order.

End effector 132 is moved into position over a ply 170 (e.g., one of many plies 170 in a stack). End effector 132 may be positioned, for example, according to instructions in a Numerical Control (NC) program kept in memory at controller 152. End effector 132 is further placed into contact with ply 170. In order to securely hold ply 170 in contact with end effector 132, fixed cup assembly 260 and multiple floating cup assemblies 250 are operated to generate pressure differentials. Specifically, Bernoulli cups 370 generate airflow that draws ply 170 into contact with end effector 132, and suction cup 830 applies suction to secure ply 170 to end effector 132, resulting in suction force at cup 830 (step 1002). These operations hold ply 170 in contact with end effector 132 without shaping ply 170. This operation may be performed such that fixed cup assembly 260 is aligned with midpoint 174 of ply 170. With ply 170 securely held in contact with end effector 132, end effector 132 is moved such that midpoint 174 of ply 170 is positioned over mandrel 160, which has a curved surface 162 as discussed above (step 1004). This is performed without shaping ply 170 by action of floating cup assemblies 250. That is, no shape is induced into ply 170 by end effector 132 prior to application of ply 170 to mandrel 160. That is, ply 170 remains flat and planar as it is moved to mandrel 160, until it is shaped by end effector 132 pushing ply 170 onto mandrel 160. In one embodiment, midpoint 174 is aligned with midpoint 164 of surface 162 of mandrel 160.

With ply 170 aligned, end effector 132 descends onto mandrel 160 as shown in FIG. 5. This action is performed with sufficient force to shape ply 170 to surface 162 of mandrel 160. As force is applied, floating cup assemblies 250 deflect along surface 162 (i.e., slip relative to surface 162), and orient normal to surface 162. Thus, end effector 132 conforms ply 170 to curved surface 162 of mandrel 160 (step 1006). During this process, Bernoulli cups 370 move along three axes in response to contact with the curved surface, and pivot in response to contact with the curved surface. That is, floating cup assemblies 250 are capable of sliding and/or floating freely along the X and Y axes of surface 172 of ply 170, while still applying downward pressure that conforms ply 170 to surface 162. Furthermore, compression springs 620 enable Bernoulli cups 370 to deflect along the Z axis, and bearings 710 of floating cup assemblies 250 enable Bernoulli cups 370 to pivot, ensuring conformance to angled portions of surface 162. In short, as ply 170 is conformed to curved surface 162, this causes Bernoulli cups 370 to float along ply 170, pivot, and deflect vertically as ply 170 changes shape. Utilizing floating cup assemblies 250 in this manner, ply 170 undergoes changes in shape while being held securely by end effector 132. Furthermore, because Bernoulli cups 370 float and pivot along ply 170, ply 170 is reshaped without the generation of wrinkles.

The method may further comprise actuating heating elements 690 after ply 170 has been shaped, and heating ply 170 in order to raise the temperature of ply 170 to a tacking temperature (e.g., 190° F.) at which ply 170 will tack to mandrel 160. Method 1000 may further be repeated in order to lay up multiple plies of dry carbon fiber into a dry pre-form. The holding, positioning, conforming, and other steps may all be performed in accordance with an NC program directing operations of the end effector.

EXAMPLES

In the following examples, additional processes, systems, and methods are described in the context of a robot that utilizes an enhanced end effector to lay up plies of dry carbon fiber.

Figure 11:
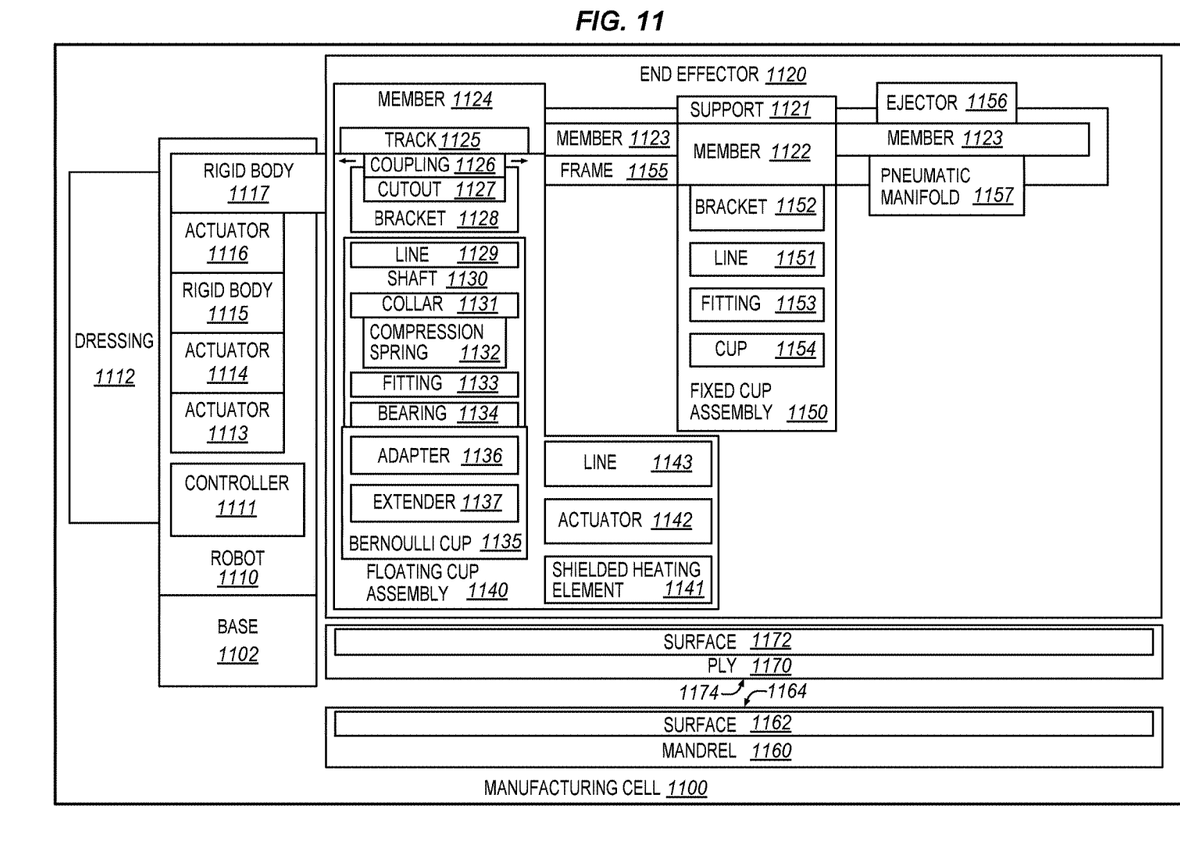
FIG. 11 is a block diagram of a robot for transporting and shaping plies of dry carbon fiber in an exemplary embodiment.

FIG. 11 is a block diagram of a robot for transporting and shaping plies of dry carbon fiber in an exemplary embodiment. According to FIG. 11, manufacturing cell 1100 includes robot 1110 attached to base 1102. Robot 1110 is utilized to conform ply 1170 to mandrel 1160, by conforming surface 1172 to surface 1162 in a position where location 1164 aligns with location 1174. Robot 1110 includes controller 1111, which manages the operations of actuators 1113, 1114, and 1116 adjusting rigid bodies 1115 and 1117 in order to adjust the position and/or orientation of end effector 1120. Robot 1110 further includes dressing 1112 which may provide electrical power and/or pressurized gas (e.g., air) to end effector 132.

End effector 1120 includes support 1121, and frame 1155. Frame 1155 includes member 1122, to which fixed cup assembly 1150 and members 1123 are attached. Ejector 1156 and pneumatic manifold 1157 are also attached to a member 1123. Floating cup assembly 1140 slides along track 1125 of member 1124. Although only one floating cup assembly 1140 is illustrated for the sake of clarity, multiple such devices are utilized at end effector 1120.

In this embodiment, floating cup assembly 1140 is attached to track 1125 via coupling 1126, which is mounted at bracket 1128 via cutout 1127 in order to hold floating cup assembly 1140 in place. Pneumatic line 1129 provides air, and shaft 1130 physically supports Bernoulli cup 1135. Collar 1131 holds compression spring 1132 in place, and fitting 1133 enables Bernoulli cup 1135 to be removed if needed. Bearing 1134 enables Bernoulli cup 1135 to pivot as desired. Bernoulli cup 1135 includes adapter 1136 and extender 1137. Floating cup assembly 1140 further includes shielded heating element 1141, pneumatic actuator 1142, and line 1143. FIG. 11 further illustrates fixed cup assembly 1150, which includes pneumatic line 1151, bracket 1152 which mounts fixed cup assembly 1150 to member 1122, and fitting 1153 which enables the replacement of cup 1154.

Figure 12:
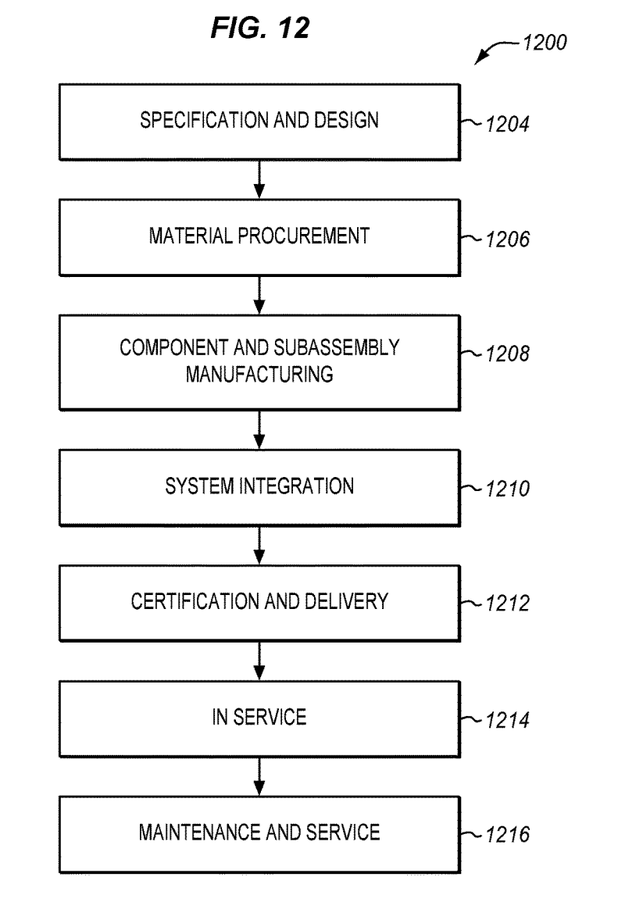
FIG. 12 is a flow diagram of aircraft production and service methodology in an exemplary embodiment.
Figure 13:
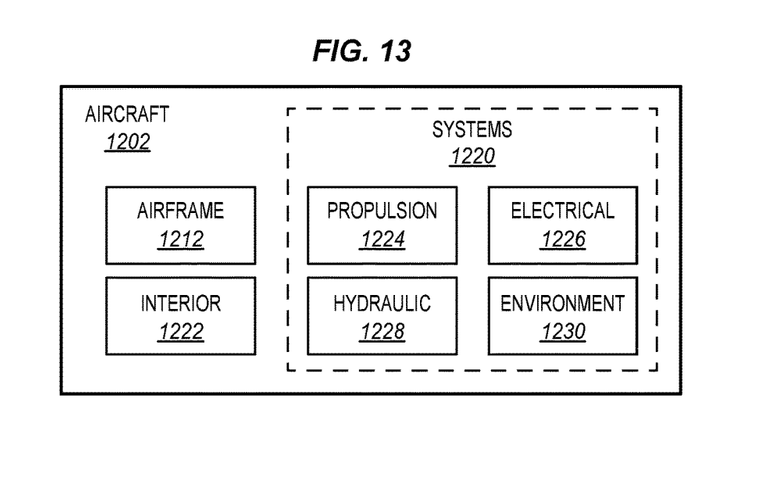
FIG. 13 is a block diagram of an aircraft in an exemplary embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, ply 170 comprises a layer of a composite part which is utilized for form a portion of airframe 1218, and is manufactured during component and subassembly manufacturing 1208. The composite part may then be assembled into an aircraft in system integration 1210, and then be utilized in service 1214 until wear renders the composite part unusable. Then, in maintenance and service 1216, the composite part may be discarded and replaced with a newly manufactured part. End effector 132 may be utilized throughout component and subassembly manufacturing 1208 in order to lay up pre-forms for impregnation with resin and curing into composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
an end effector of a robot, comprising:
a frame;
a fixed cup assembly that is attached to the frame, comprising:
a suction cup for holding a ply;
a pneumatic line applying negatively pressurized gas to an interior of the suction cup; and
a shaft that is coupled with the suction cup and that houses the pneumatic line, the shaft enabling the suction cup to translate vertically; and
floating cup assemblies that are attached to the frame, each comprising:
a Bernoulli cup;
a pneumatic line applying positively pressurized gas to the Bernoulli cup;
a shaft that is coupled with the Bernoulli cup and that houses the pneumatic line, the shaft enabling the Bernoulli cup to translate vertically; and
a bearing that enables the Bernoulli cup to pivot about an end of the shaft to conform with a surface.

2. The apparatus of claim 1 further comprising:
at least one heating element that heats the ply to a tacking temperature of at least one hundred and eighty degrees Fahrenheit.

3. The apparatus of claim 2 wherein:
each of the at least one heating element is mounted at a different floating cup assembly.

4. The apparatus of claim 3 wherein:
each floating cup assembly further comprises a pneumatic actuator that controllably actuates a corresponding heating element into contact with the ply.

5. The apparatus of claim 1 wherein:
at rest, the suction cup of the fixed cup assembly is coplanar with the Bernoulli cups of the floating cup assemblies.

6. The apparatus of claim 1 wherein:
the fixed cup assembly secures a ply of carbon fiber to the suction cup; and
the floating cup assemblies each draw the ply to a Bernoulli cup while floating horizontally with respect to the ply.

7. The apparatus of claim 1 wherein:
each Bernoulli cup comprises an extender that acts as a lever arm, thereby reducing an amount of force needed to pivot the Bernoulli cup to a new orientation.

8. A method for transporting a ply of carbon fiber, comprising:
holding a ply of carbon fiber in contact with an end effector of a robot via a suction cup and multiple Bernoulli cups without shaping the ply;
positioning the ply over a mandrel having a curved surface, without shaping the ply; and
conforming the ply to the curved surface of the mandrel, causing the Bernoulli cups to float along the ply, pivot, and deflect vertically as the ply changes shape.

9. The method of claim 8 for transporting a ply of carbon fiber, further comprising:
applying suction via the suction cup as the ply is conformed to the curved surface of the mandrel, thereby preventing the ply from displacing and rotating.

10. The method of claim 8 for transporting a ply of carbon fiber, wherein:
the holding, positioning, and conforming are performed in accordance with a Numerical Control (NC) program directing operations of the end effector.

11. The method of claim 8 for transporting a ply of carbon fiber, wherein:
conforming the ply to the curved surface of the mandrel comprises pressing the ply onto the curved surface of the mandrel via the end effector.

12. The method of claim 8 for transporting a ply of carbon fiber, wherein:
positioning the ply over the mandrel is performed by action of the Bernoulli cups.

13. The method of claim 8 for transporting a ply of carbon fiber, further comprising:
heating the ply to a tacking temperature of at least one hundred and eighty degrees Fahrenheit, wherein the ply of carbon fiber is a ply of dry carbon fiber.

14. The method of claim 13 for transporting a ply of carbon fiber, wherein:
heating the ply is performed via heating elements located at each floating cup assembly.

15. The method of claim 14 for transporting a ply of carbon fiber, further comprising:
pneumatically actuating the heating elements into contact with the ply.

16. The method of claim 8 for transporting a ply of carbon fiber, further comprising:
utilizing a compression spring to return the Bernoulli cups to a default position after the Bernoulli cups have been deflected.

17. A non-transitory computer readable medium embodying programmed instructions which, when executed by a processor, are operable for performing a method for transporting a ply of dry carbon fiber, comprising:
holding a ply of dry carbon fiber in contact with an end effector of a robot via a suction cup and multiple Bernoulli cups without shaping the ply;
positioning the ply over a mandrel having a curved surface, without shaping the ply; and
conforming the ply to the curved surface of the mandrel, causing the Bernoulli cups to float along the ply, pivot, and deflect vertically as the ply changes shape.

18. The medium of claim 17 wherein the method for transporting a ply of carbon fiber further comprises:

applying suction via the suction cup as the ply is conformed to the curved surface of the mandrel, thereby preventing the ply from displacing and rotating.

19. The medium of claim 17 wherein:
the holding, positioning, and conforming are performed in accordance with a Numerical Control (NC) program directing operations of the end effector.

20. The medium of claim 17 wherein:
conforming the ply to the curved surface of the mandrel comprises pressing the ply onto the curved surface of the mandrel via the end effector.

21. The medium of claim 17 wherein:
positioning the ply over the mandrel is performed by action of the Bernoulli cups.

22. The medium of claim 17 wherein the method further comprises:
heating the ply to a tacking temperature of at least one hundred and eighty degrees Fahrenheit.

23. The medium of claim 22 wherein:
heating the ply is performed via heating elements located at each floating cup assembly.

24. The medium of claim 23 wherein the method for transporting a ply of carbon fiber further comprises:
pneumatically actuating the heating elements into contact with the ply.

* * * * *